(12) United States Patent
Travis et al.

(10) Patent No.: US 9,602,767 B2
(45) Date of Patent: Mar. 21, 2017

(54) TELEPRESENCE EXPERIENCE

(71) Applicant: Microsoft Corporation, Redmond, WA (US)

(72) Inventors: Adrian Robert Leigh Travis, Seattle, WA (US); Andreas Georgiou, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 46 days.

(21) Appl. No.: 14/512,296

(22) Filed: Oct. 10, 2014

(65) Prior Publication Data

US 2016/0105640 A1   Apr. 14, 2016

(51) Int. Cl.
| | |
|---|---|
| *H04N 7/14* | (2006.01) |
| *H04N 7/15* | (2006.01) |
| *H04N 13/04* | (2006.01) |
| *H04N 5/225* | (2006.01) |
| *G02B 26/08* | (2006.01) |
| *H04N 5/232* | (2006.01) |

(52) U.S. Cl.
CPC .......... *H04N 7/15* (2013.01); *G02B 26/0858* (2013.01); *H04N 5/2254* (2013.01); *H04N 7/144* (2013.01); *H04N 13/0484* (2013.01); *H04N 5/23216* (2013.01)

(58) Field of Classification Search
USPC ..... 348/14.01, 14.08, 14.09, 14.1, 137, 142, 348/211.12, E7.08
See application file for complete search history.

(56) References Cited

U.S. PATENT DOCUMENTS

| | | | |
|---|---|---|---|
| 6,819,469 B1 | 11/2004 | Koba | |
| 7,197,213 B2 | 3/2007 | Graves | |
| 7,548,677 B2 | 6/2009 | Bathiche et al. | |
| 8,027,580 B2 | 9/2011 | Chang | |
| 8,160,409 B2 | 4/2012 | Large | |
| 8,351,744 B2 | 1/2013 | Travis et al. | |
| 2003/0090579 A1* | 5/2003 | Ohe | G02B 7/10 348/240.3 |
| 2007/0120879 A1* | 5/2007 | Kanade | H04N 7/144 346/107.2 |
| 2010/0302344 A1 | 12/2010 | Large et al. | |

(Continued)

FOREIGN PATENT DOCUMENTS

| | | |
|---|---|---|
| EP | 2667620 A2 | 11/2013 |
| WO | 0245413 A1 | 6/2002 |

OTHER PUBLICATIONS

Boual, et al., "Wedge Displays as Cameras", in Proceedings of SID Symposium Digest of Technical Papers, vol. 37, Issue 1, Jun. 2006, 4 pages.

(Continued)

*Primary Examiner* — Yosef K Laekemariam
(74) *Attorney, Agent, or Firm* — Brandon Roper; Judy Yee; Micky Minhas

(57) ABSTRACT

The description relates to creating a window-like experience during video communication scenarios. One example can include a spatial light deflector including a steerable array of light deflecting elements. The example can also include a wedge device positioned relative to the spatial light deflector. The example can also include a camera positioned at an end of the wedge device to receive the captured light.

20 Claims, 13 Drawing Sheets

(56) References Cited

U.S. PATENT DOCUMENTS

| | | |
|---|---|---|
| 2011/0188106 A1 | 8/2011 | Bae et al. |
| 2011/0199497 A1 | 8/2011 | Motta |
| 2012/0041721 A1 | 2/2012 | Chen |
| 2012/0287323 A1 | 11/2012 | Border |
| 2013/0308185 A1 | 11/2013 | Robinson et al. |
| 2014/0078383 A1* | 3/2014 | Schmaelzle ............ G03B 15/02 348/371 |
| 2016/0004302 A1* | 1/2016 | Bolle ...................... G06F 3/013 348/14.08 |

OTHER PUBLICATIONS

Han, Wei, "Transmissive Beam Steering Through Electrowetting Microprism Arrays", in Thesis, Dec. 2009, 64 pages.

"Apple's Head Mounted Display & Image Generation System", Published on: Jul. 7, 2012, Available at: http://www.patentlyapple.com/patently-apple/2012/07/apples-special-project-for-a-video-telephonic-headset-wins-a-second-patent.html.

Surman, et al., "Head Tracked Single and Multi-User Autostereoscopic Displays", in Proceedings of 3rd European Conference on Visual Media Production, Nov. 29, 2006. pp. 144-152.

Schwerdtner, et al., "25.2: Eye-Tracking Solutions for Real-Time Holographic 3-D Display", in Proceedings of SID Symposium Digest of Technical Papers, vol. 39, Issue 1, May, 2008, pp. 345-347.

Kim, et al., "62.1: Distinguished Paper: Multi-View Three-Dimensional Display System by Using Arrayed Beam Steering Devices", in Proceedings of SID Symposium Digest of Technical Papers, vol. 45, Issue 1, Jun. 1, 2014, 3 pages.

International Search Report and Written Opinion mailed Jan. 7, 2016 from PCT Patent Application No. PCT/US2015/054354, 11 pages.

Article 34 Amendment filed Apr. 21, 2016 from PCT Patent Application No. PCT/US2015/054354, 9 pages.

Second Written Opinion mailed Oct. 4, 2016 from PCT Patent Application No. PCT/US2015/054354, 7 pages.

International Preliminary Report on Patentability mailed Jan. 19, 2017 from PCT Patent Application No. PCT/US2015/054354, 8 pages.

* cited by examiner

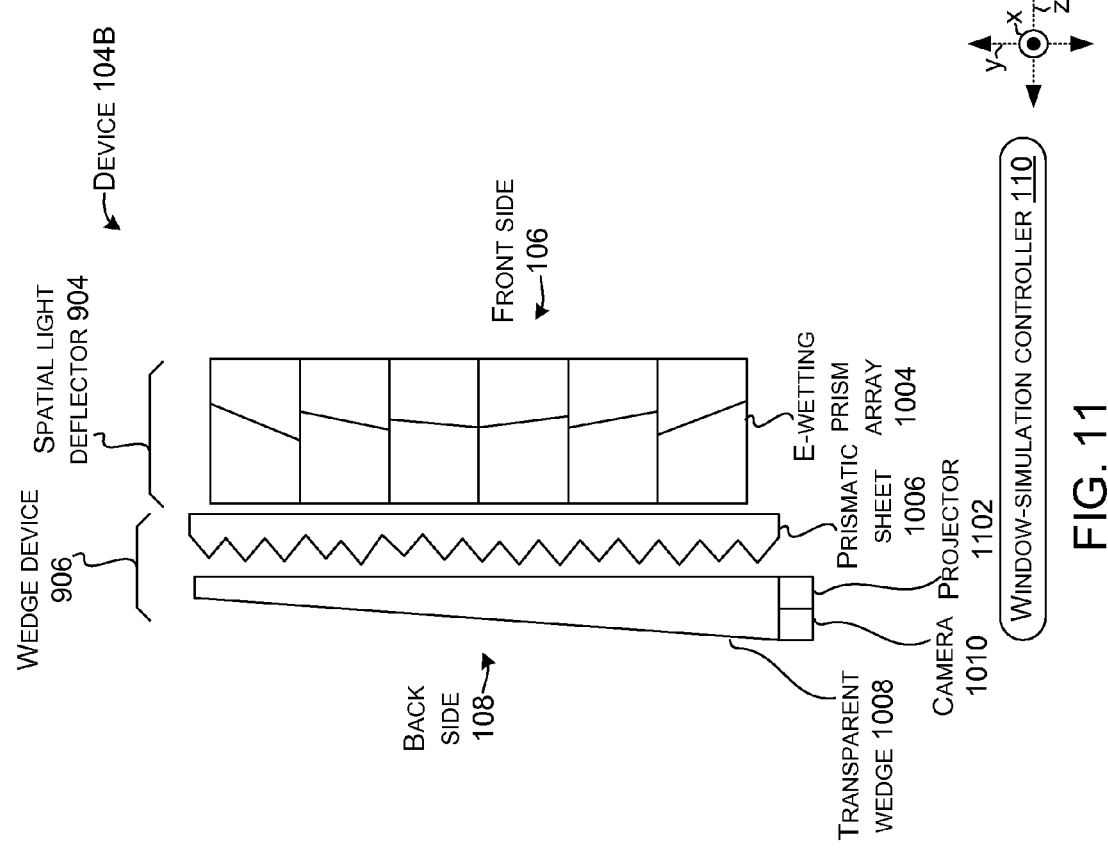
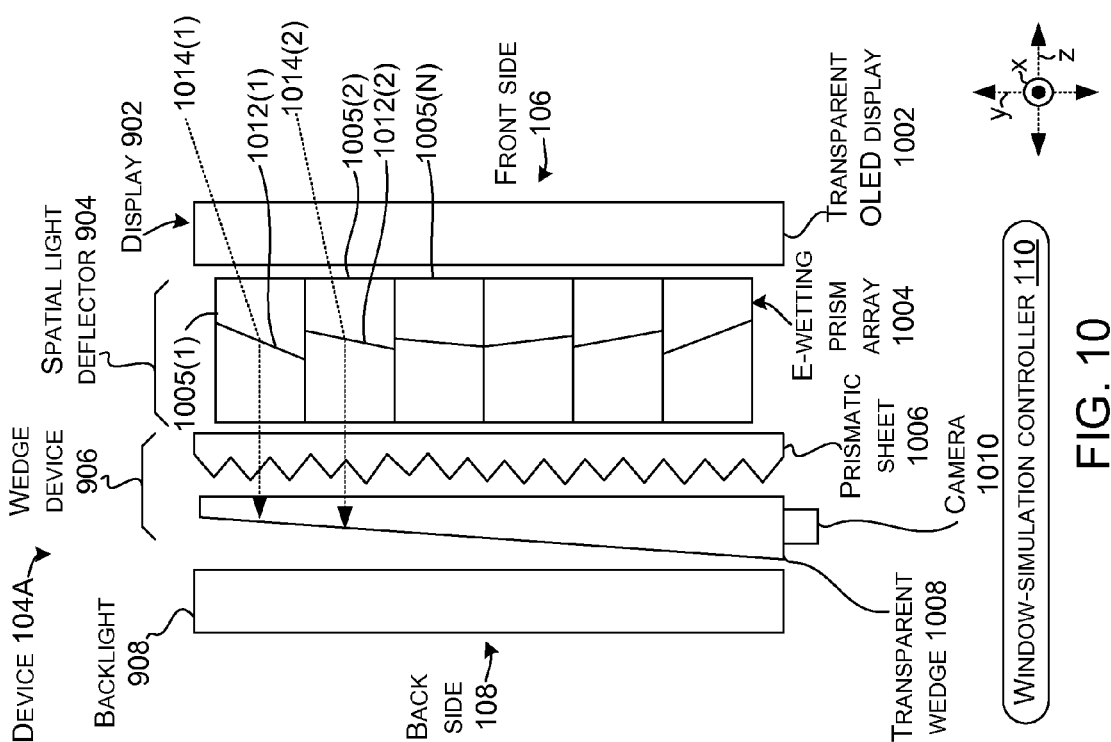
FIG. 10
FIG. 11

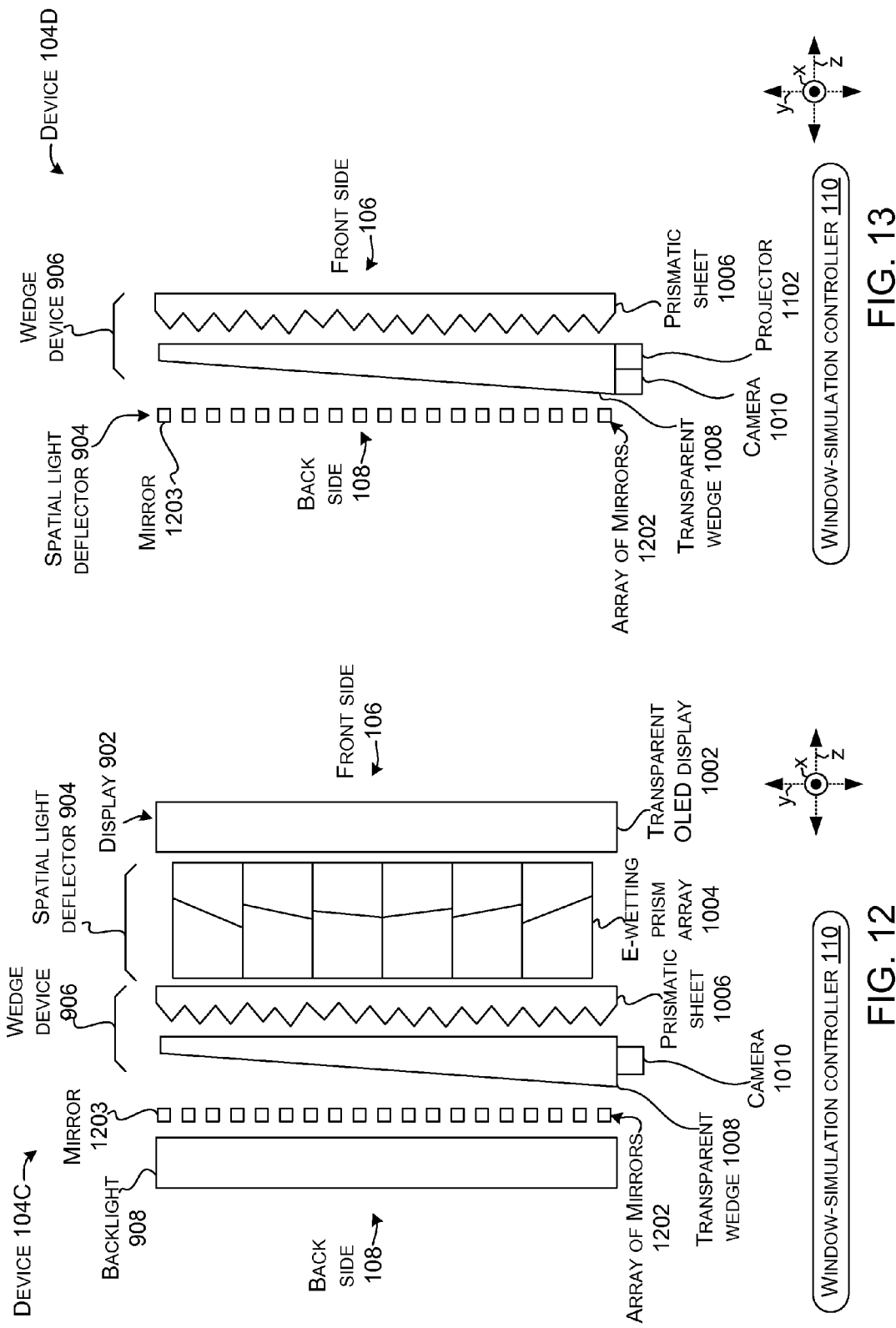

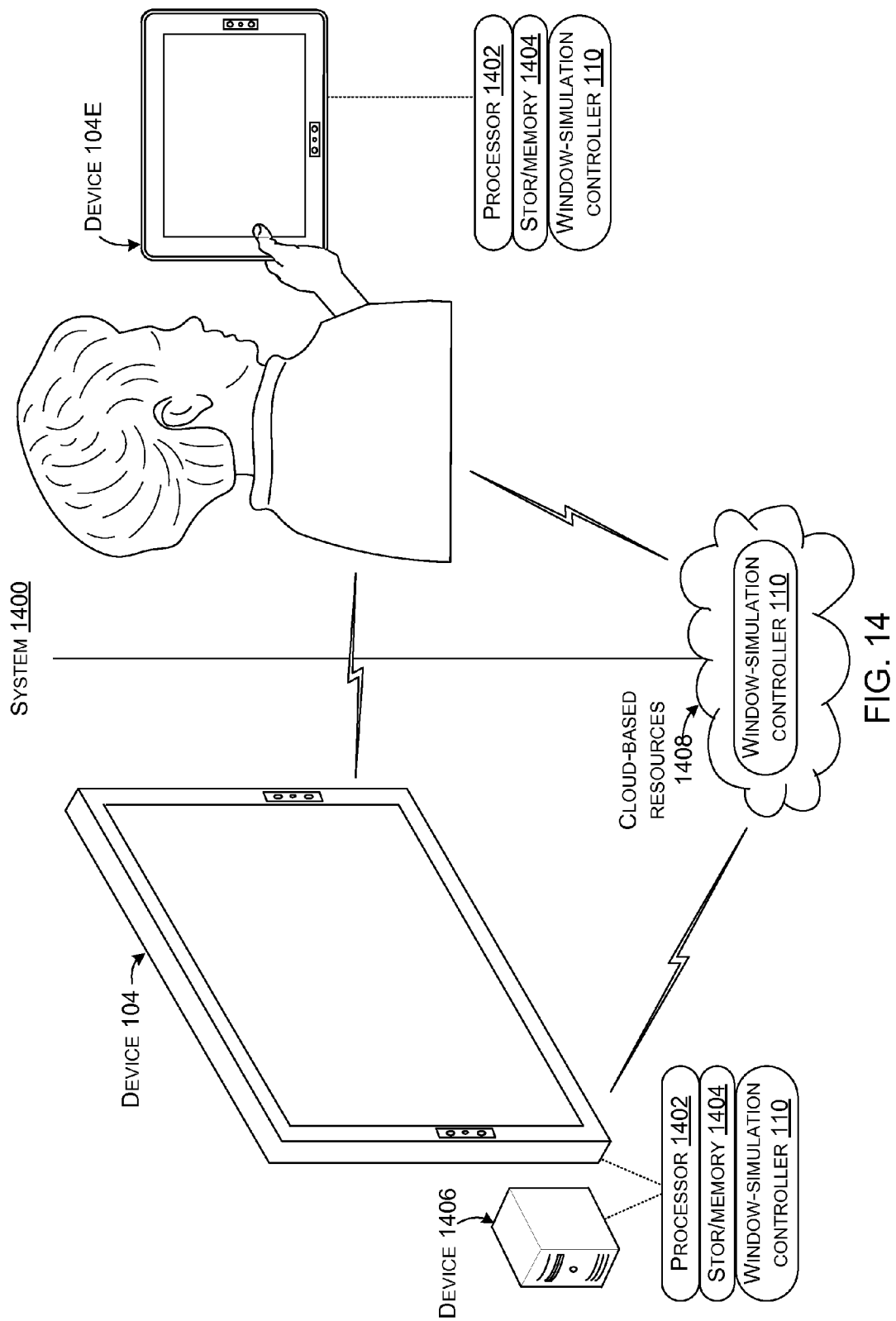

TELEPRESENCE EXPERIENCE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

FIGS. 10-13 show sectional views of examples of window-simulation devices in accordance with some implementations of the present concepts.

FIG. 14 shows an example window-simulation system in accordance with some implementations of the present concepts.

DESCRIPTIONS

Figure 1:
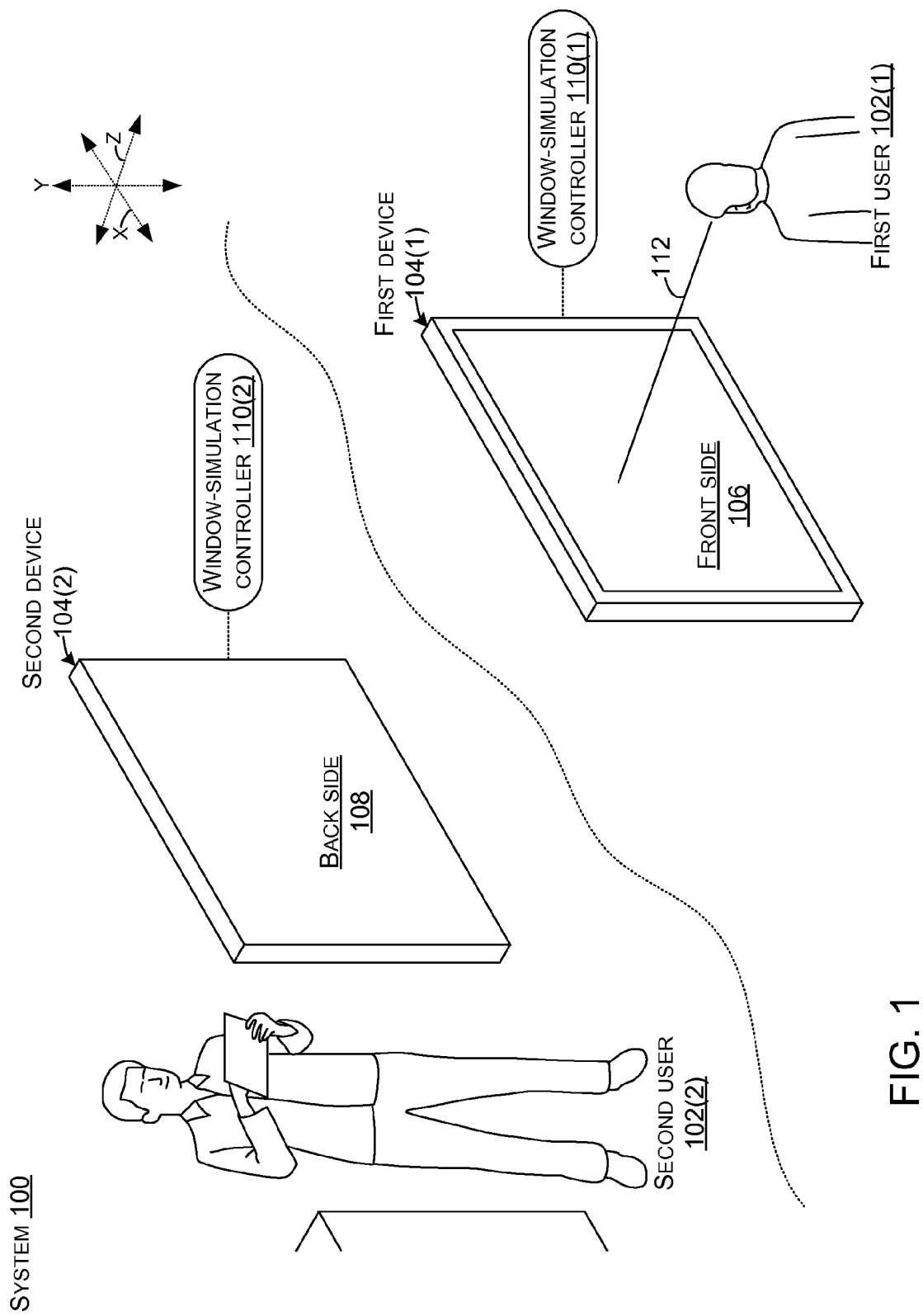
FIGS. 1-8 show example window-simulation scenarios or systems in accordance with some implementations of the present concepts.

Devices facilitate how people interact in face-to-face discussions. People can communicate in various ways, such as voice, gestures, eye gaze, how they orient themselves with one another, etc. Devices may not be able to provide such features in remote scenarios.

This patent relates to display devices that can both present and capture images. For example, the display device can be a flat panel digital display that can capture an image from the flat panel digital display that is analogous to an image captured by a point behind the flat panel digital display. When combined with a similar, but remotely located companion display device, the display device can look to the user like a pane of glass (e.g., a window) except that when the user looks through the display device, the user sees a scene in another part of the world and vice versa. Toward this end, some implementations can employ a combination of a steerable array of beam-deflecting facets with a large area camera that has low étendue (e.g., relative angles of light rays are generally conserved during refraction and/or reflection by the device). Examples of scenarios relating to this window-like effect are described relative to FIGS. 1-8. Example device configurations for achieving the window-like effect are described relative to FIGS. 9-13.

FIGS. 1-8 collectively show a use case scenario or system 100 that involves a window-like effect or window-simulation. This system involves a first or local user 102(1) and a second or remote user 102(2). (For ease of explanation, only a single user is shown at each location, but the system can handle multiple users at a given location). A first device 104(1) is co-located with the first user 102(1) and a second device (e.g., remote companion device) 104(2) is co-located with the second user 102(2). For purposes of explanation, the devices can have a front side 106 which displays images and an opposite backside 108. In the illustrated view, the front side 106 of the first device 104(1) is visible and the backside 108 of the second device 104(2) is visible. (FIGS. 10-13 show sectional views of a device with both the front side and the back side indicated). A window-simulation controller 110 can operate cooperatively with the respective device 104.

For sake of brevity the following explanation of FIGS. 1-8 is described relative to the first user 102(1). Note, however, that similar processes can be simultaneously occurring relative to the second user 102(2).

In FIG. 1 eye-related information can be gathered about the first user 102(1) relative to first device 104(1). The eye-related information can relate to a relative position of the user relative to the first device, a distance from the first user's eyes to the first device, and/or a direction that the user is looking relative to the first device (e.g., gaze direction), among others. In system 100, the eye-related information is represented by line 112. Note that in this case, a single line is utilized that is centered between the user's eyes. Other implementations can perform the same process for each eye individually to create a 3D image (e.g., left and right stereoscopic images) as perceived by the user. Also note that if multiple users were looking at device 104(1) a similar line (to line 112) could be determined for each of them, or two lines for each of them in the case of 3D images.

Figure 2:
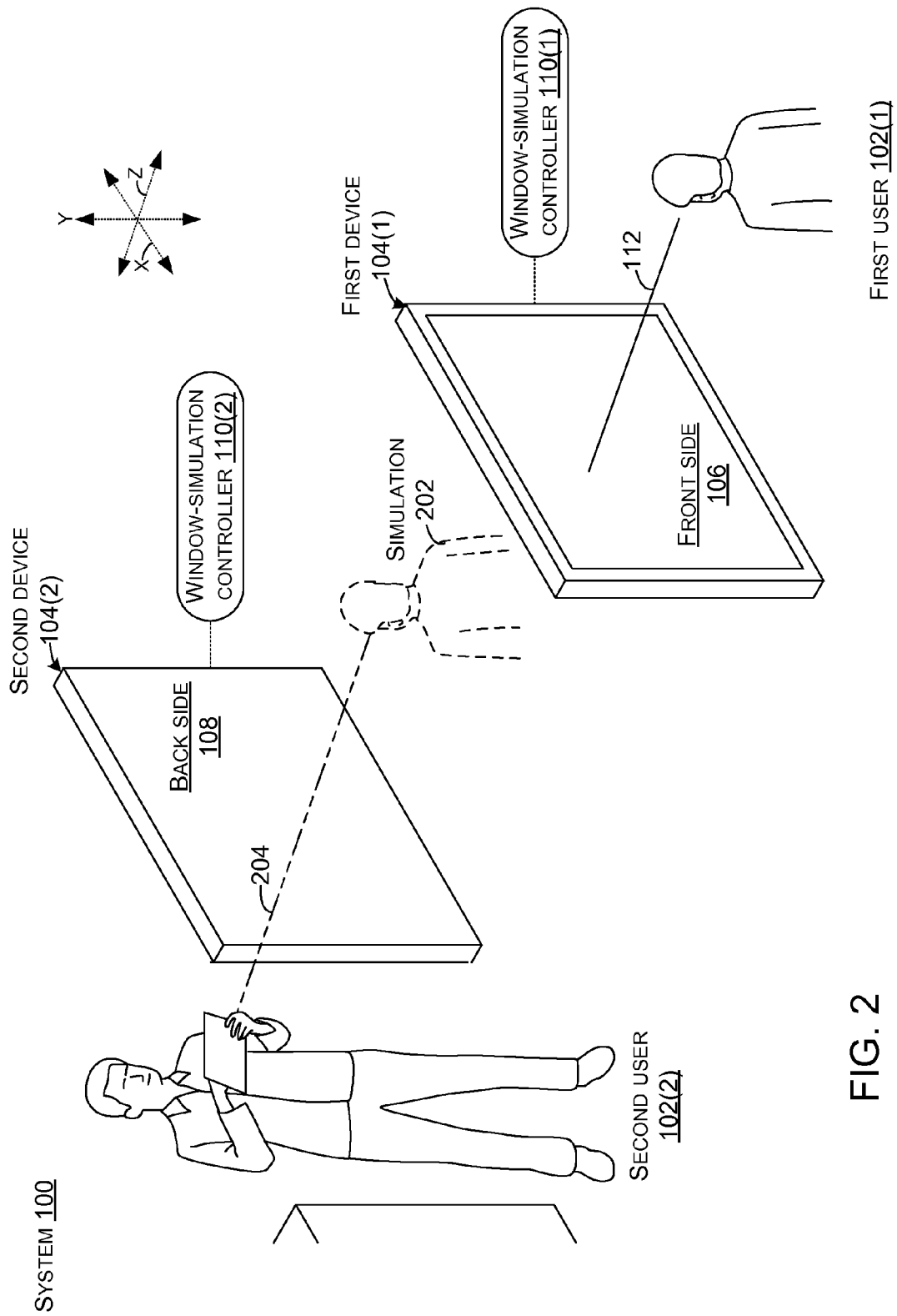

In FIG. 2, the first user's eye-related information can be used at the second device 104(2) to determine what light to capture for the first user. One way to think of this is with a simulation 202 of the first user. The simulation is shown in ghost since it is provided for purposes of explanation. The simulation can include line 204 that simulates line 112. For purposes of explanation, line 204 is extended through device 104(2) into the scene (e.g., to the second user 102(2)). The simulation 202 can be positioned behind the second device (e.g., facing the backside 108) to mimic the first user's position in front of the first device 104(1). Thus, the position of the simulation, the distance from the simulation to the second device, and the direction that the simulation is looking can be defined by the eye-related information. As such, simulated line 204 can define the center of what the first user would see if he was looking through the second device 104(2).

Figure 3:
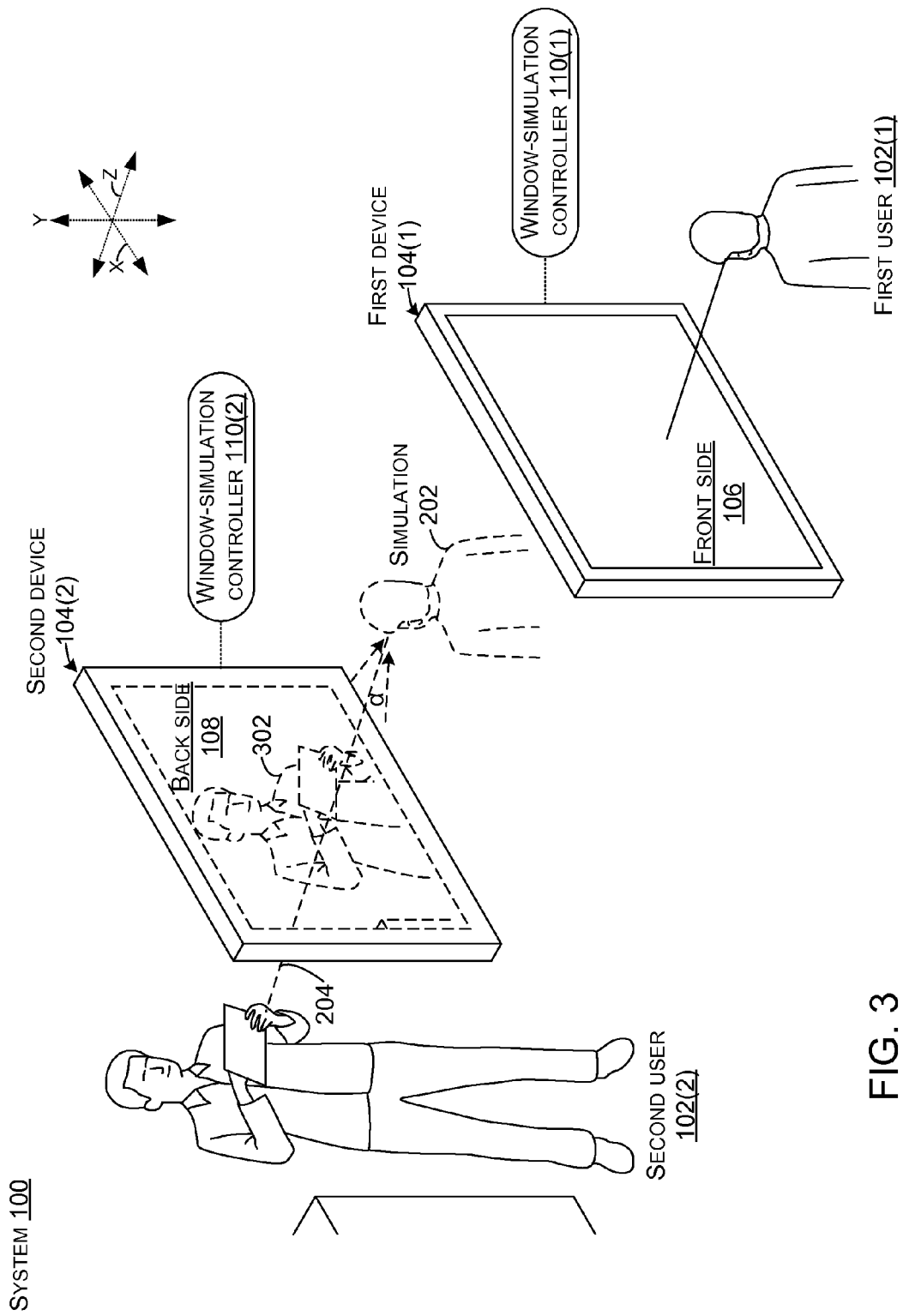

FIG. 3 shows a representation 302 of what the first user 102(1) (e.g., the user's simulation 202) would see looking through the back side 108 of the second device 104(2). The representation 302 is shown in ghost since there is not actually an image presented on the back side of the second device. The second device 104(2) can capture the light striking the front side of the second device that would create the image of the representation 302. Image information about this light can be transmitted to the first device 104(1). From one perspective, line 204 can be thought of as a central axis emanating from the first user's eye. The captured light can be light within an angle α of the central axis that would strike the first user's eyes. The representation 302 can be thought of as the region of light striking the front side of second device 104(2) that is within angle α and would strike the eyes of the simulation 202 if it did not encounter second device 104(2).

Figure 4:
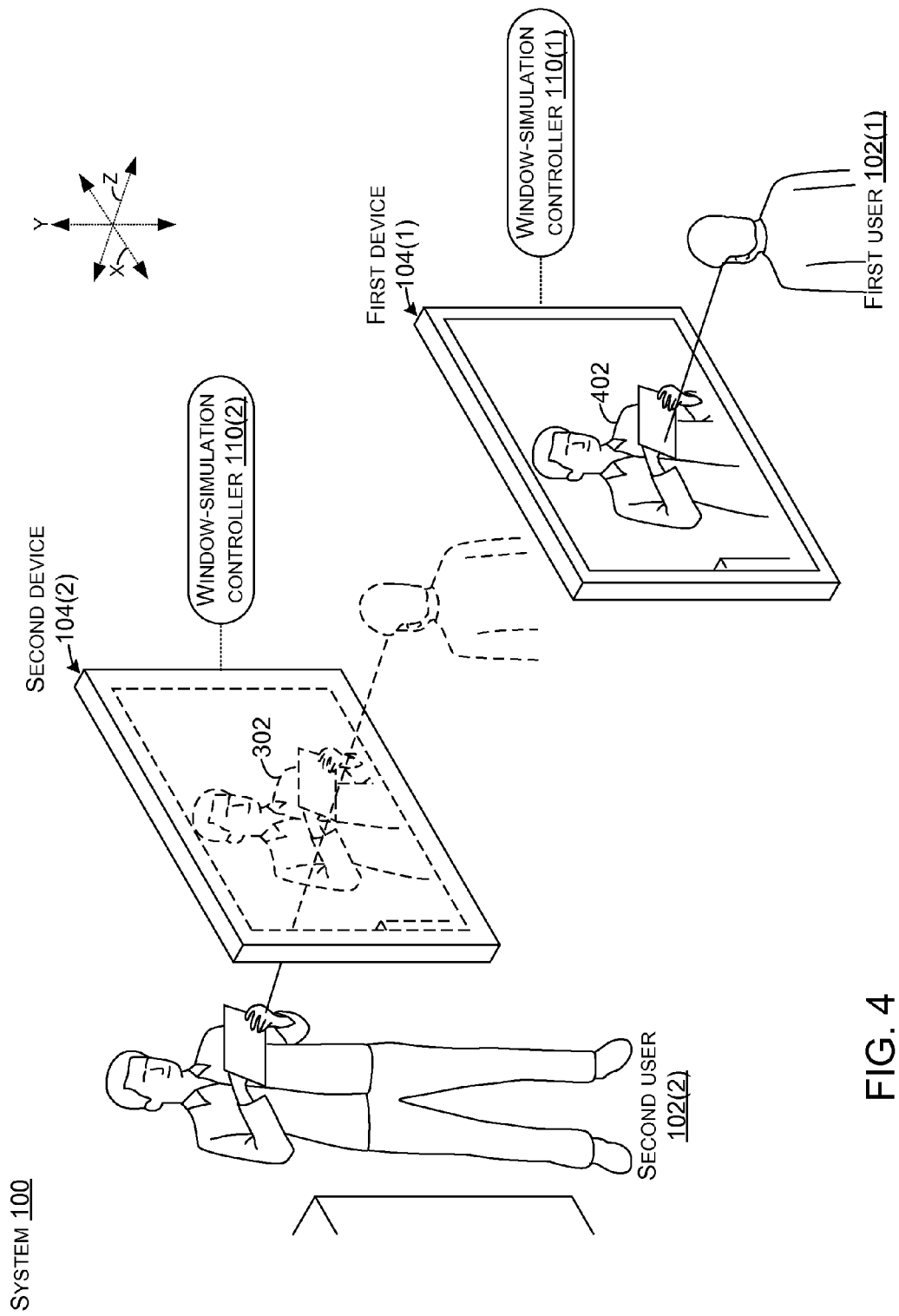

FIG. 4 shows first device 104(1) presenting an image 402 corresponding to the representation 302 of FIG. 3. The first device can generate the image based upon the image information obtained from the second device 104(2). Image 402 thus recreates what the first user 102(1) would see if he looked through device 104(1) as if he were looking through the back of device 104(2) at the same relative position, distance, and eye gaze direction as he is from the front of the first device.

Figure 5:
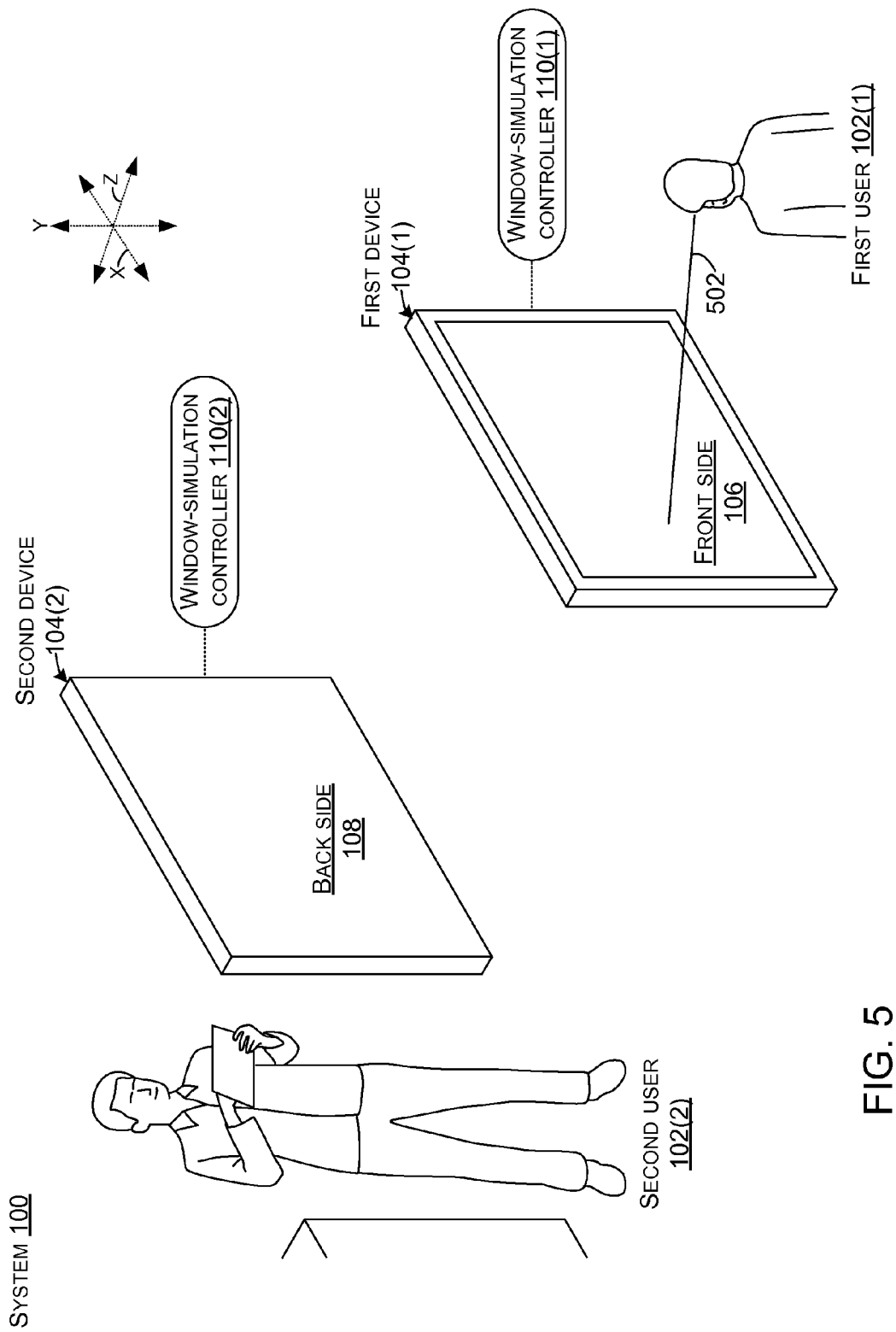

FIG. 5 shows a subsequent view of the first user 102(1). At this point, the first user is at the same relative location and distance from the first device 104(1), but has shifted his gaze as represented by line 502 (compare to line 112 of FIG. 1). This updated eye-related information can be sent to second device 104(2).

Figure 6:
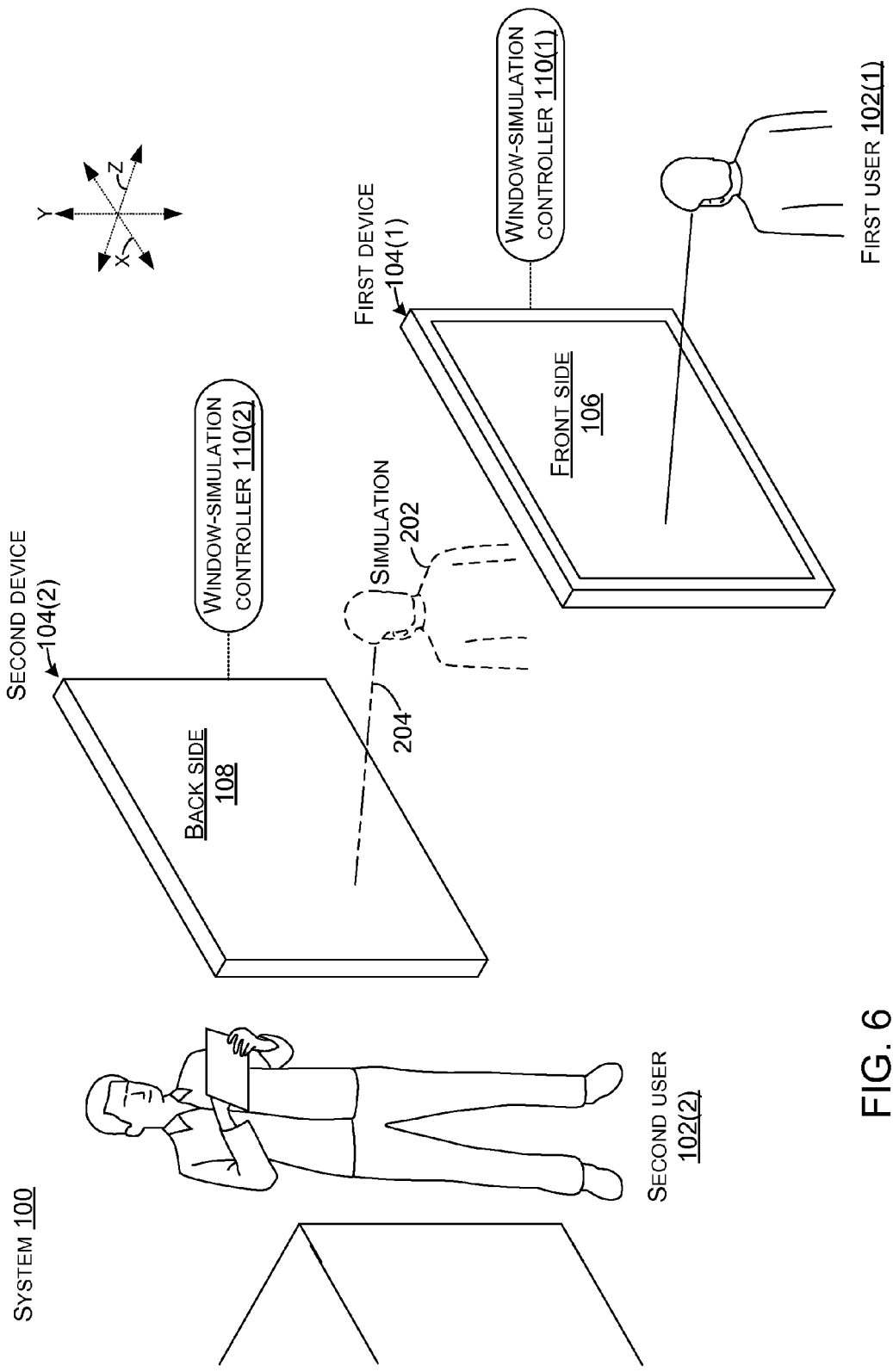

FIG. 6 shows simulation 202 and line 204 updated to reflect the new eye-related information from first device 104(1).

Figure 7:
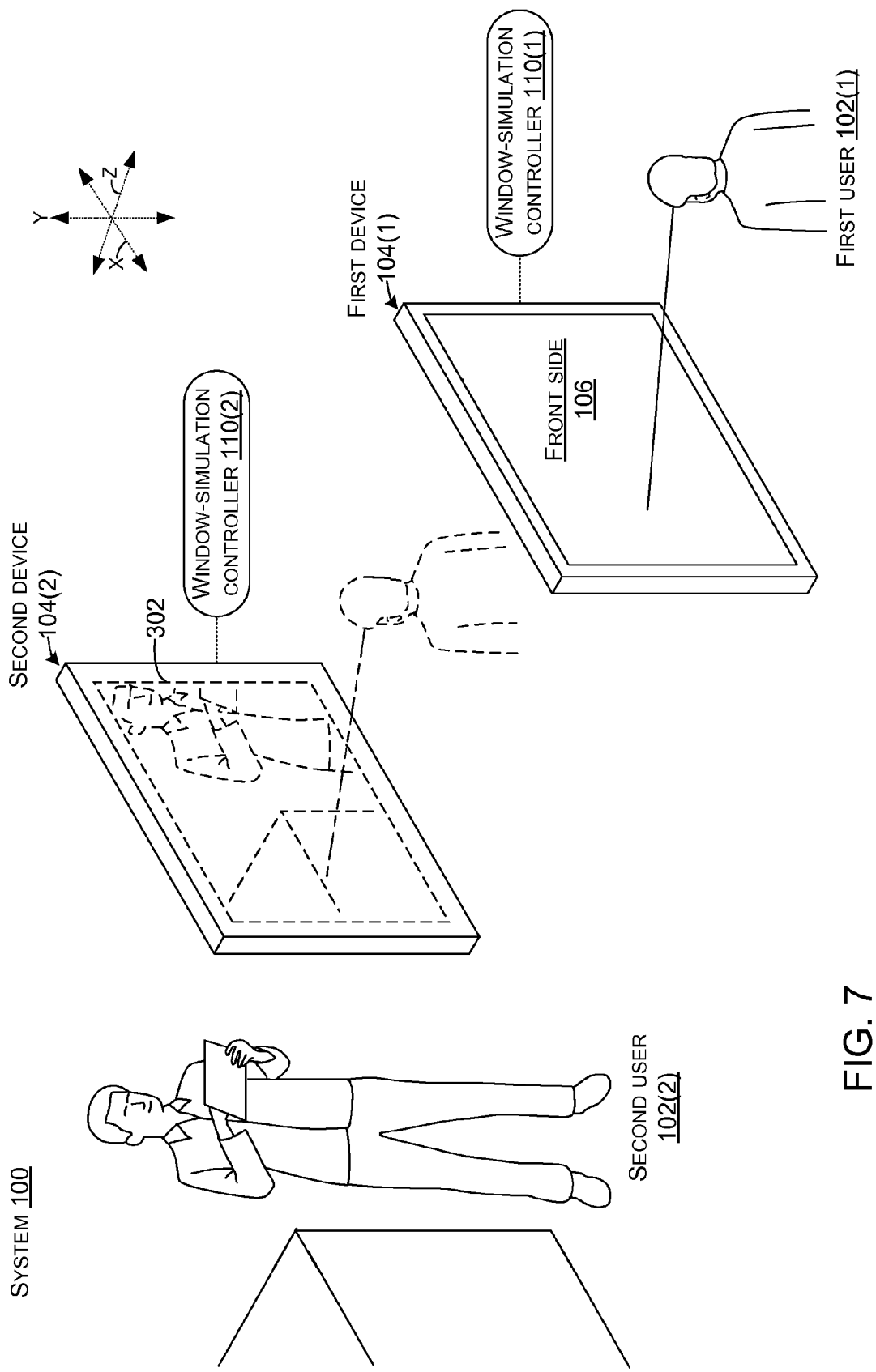

FIG. 7 shows updated representation 302 at second device 104(2). The representation 302 can represent the light rays which would end in the eyes of the first user 102(1) if he was looking through first device 104(1) and out of second device 104(2). Image information about the representation 302 can be sent to the first device 104(1).

Figure 8:
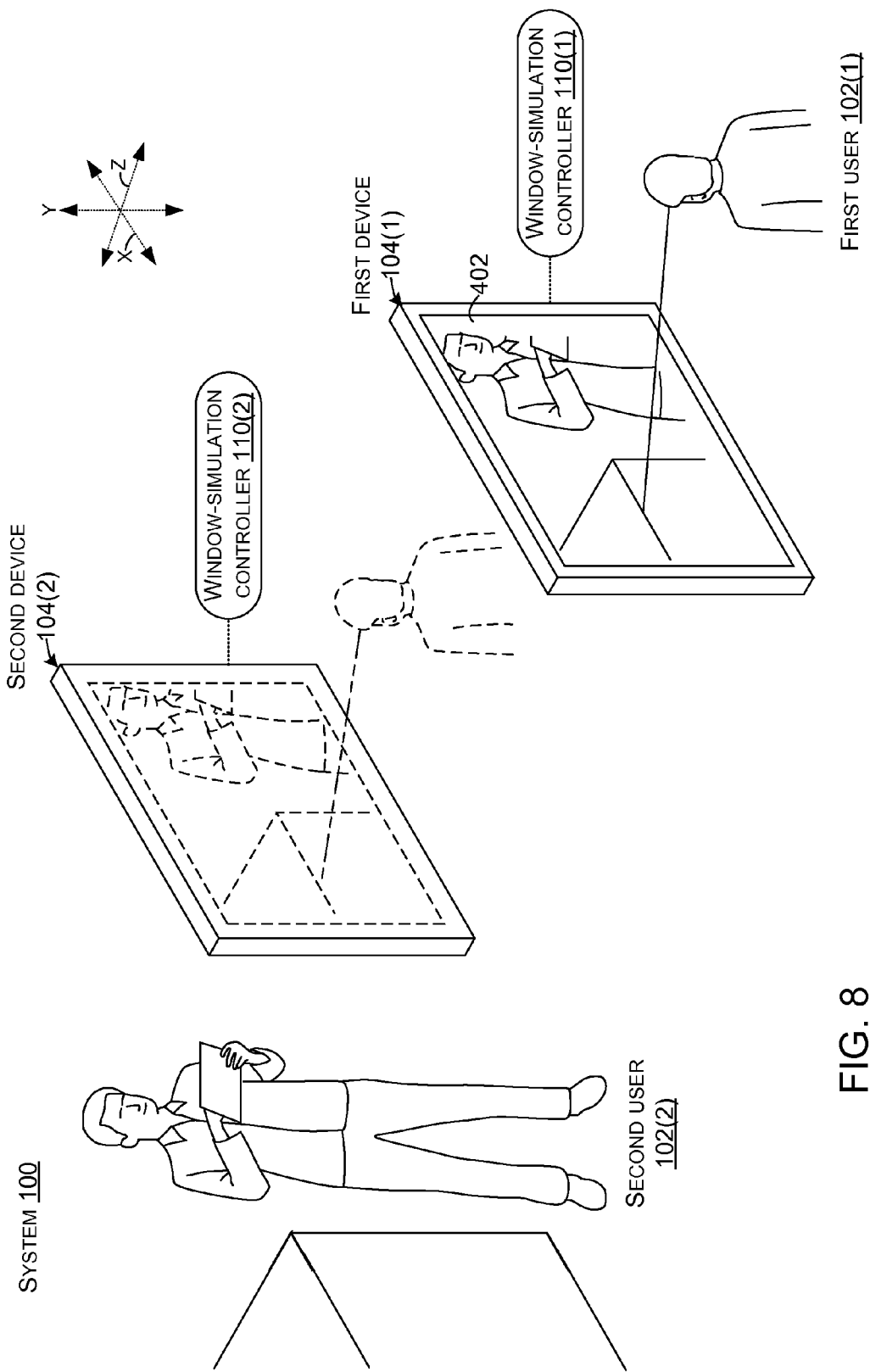

FIG. 8 shows image 402 generated on first device 104(1) that is based upon representation 302. Just as in FIG. 4, the first user 102(1) is presented with the image 402 that corresponds to his position, location, and eye-gaze relative to the first device even though the information for the image is gathered at second device 104(2).

Viewed from one perspective, FIGS. 1-8 show how eye-related information can be gathered relative to a first device. This eye-related information can be used to capture light at a second device that would otherwise pass through the second device and reach a point defined by the eye-related information. Image information about the captured light can be sent to the first device. The first device can generate an image from the image information that can be seen by the first user but may not be visible to others (e.g., because their eyes are not at the same location as the user's eyes). The process can be simultaneously repeated for the second user associated with the second device 104(2).

Figure 9:
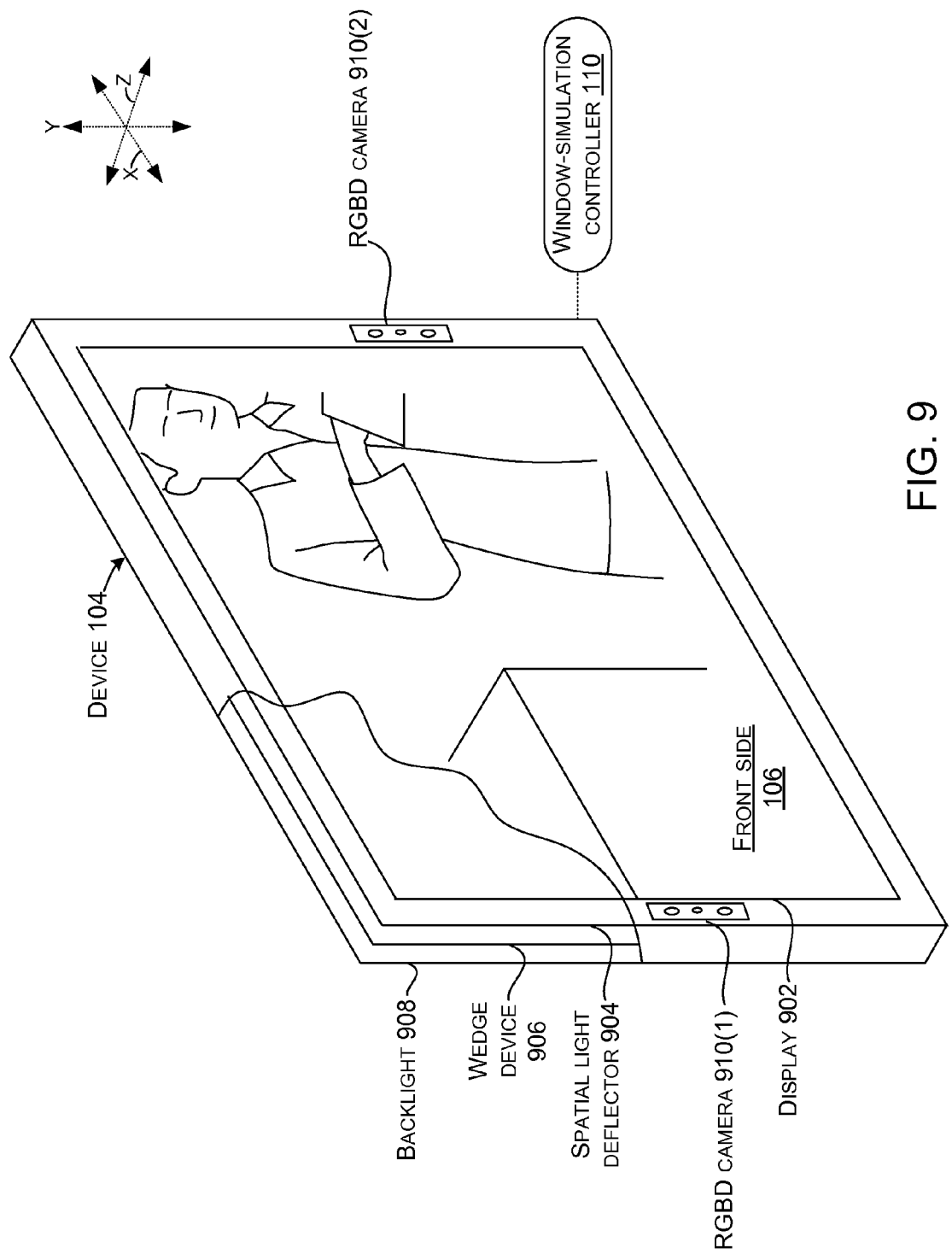
FIG. 9 shows a partial cutaway perspective view of an example window-simulation device in accordance with some implementations of the present concepts.

FIG. 9 shows a partial cut-away view of the front side 106 of device 104 (either first device 104(1) or second device 104(2)). For sake of brevity, only a single device is shown, but as explained above relative to FIGS. 1-8 this device can operate in cooperation with another remote companion device. In this example, the device includes a display or display screen 902, a spatial light deflector (e.g., light steering element) 904, a wedge device 906, and a backlight 908. In this case, the device 104 also includes the window-simulation controller 110 and a pair of red, green, blue+depth (RGBD) cameras 910(1) and 910(2). FIGS. 10-13 are sectional views that show variations of the basic configuration shown in FIG. 9.

Initially, the window-simulation controller 110 can utilize the RGBD cameras 910(1) and 910(2) to determine the eye-related information. For instance, the window-simulation controller 110 via the RGBD cameras can identify the user's face and/or eyes, determine the distance from the user's face/eyes to the display 902, and which way the user is looking. For example, the color images from the RGBD cameras can be analyzed utilizing face recognition software to identify the face and the eyes. Further analysis can indicate the direction the eyes are looking. The depth images can provide the distance from the display to the eyes and the relative position. The window-simulation controller 110 can send this eye-related information to the remote companion device and receive similar eye-related information from the remote companion device. The window-simulation controller 110 can then alternatively display images (e.g., project light) based upon image information from the remote device and capture images (e.g., light striking the front side 106 of the display 902). The window-simulation controller 110 can perform these alternating functions at a rate that is undetectable to the user, such as at a rate of 50 Hertz or higher (e.g., to avoid flicker).

FIGS. 10-13 show several different device configurations distinguished as 104A, 104B, 104C, and 104D. Some elements are common to the different configurations and as such are not reintroduced or discussed relative to each FIG.

FIG. 10 shows device configuration 104A. The device 104A includes display 902, spatial light deflector 904, wedge device 906, and backlight 908 juxtaposed against one another from the front side 106 to the back side 108. In this case the display 902 is manifest as a transparent organic light emitting diode (OLED) display 1002. The spatial light deflector 904 is manifest as an electro-wetting prism array 1004 that includes multiple selectably controllable prisms 1005 (not all of which are designated with specificity). In this implementation, the prisms are formed from two fluids that have differing refractive indexes. Briefly, the angle of the interface between two fluids is set by an electric field between those fluids and a side-wall. One of the fluids has a high refractive index, the other low so that as the interface tilts, it acts as a prism of variable angle. The wedge device 906 is manifest as a prismatic sheet 1006, a transparent wedge 1008, and at least one camera 1010. The camera may be a single camera or an array of cameras positioned along the x reference axis at the wide end of the transparent wedge to capture specific y axis columns of light striking the display.

Based upon eye-related information from the remote device, window-simulation controller 110 can selectively energize individual prisms 1005. The amount of voltage applied to an individual prism can affect an interface 1012 (not all of which are designated with specificity) between the two fluids. The interface determines the degree of refraction caused by the prism and thus the voltage can be used to 'steer' the angle of the individual prism. For instance, compare the angle of interface 1012(1) to the angle of interface 1012(2) and the associated difference in the angle of refraction of respective light rays 1014(1) and 1014(2). Thus, the window-simulation controller 110 can determine which light rays to capture (e.g., those striking a specific location on the transparent OLED 1002 at a specific angle). These light rays can pass through the transparent OLED and be refracted at an angle selected for an individual prism to cause the light rays to enter the wedge device 906 at an angle that is readily captured by the transparent wedge 1008. The captured light will tend to reflect within the transparent wedge until it reaches the thick end upon which the camera 1010 is positioned.

As noted, there may be multiple cameras 1010 positioned along the transparent wedge 1008 along the x reference direction. The window-simulation controller 110 can obtain images from the camera or cameras that are aligned below the captured light rays in the y reference direction. Note that the window-simulation controller could obtain images from all of the cameras, but this could tend to produce large amounts of superfluous data that may overwhelm processing and/or network resources. Instead, the window-simulation controller can select the camera(s) along the transparent wedge 1008 to obtain the light rays of interest. The window-simulation controller can send the image information to the remote companion device for presentation. During this capture phase, the window-simulation controller 110 can turn off the backlight 908 to avoid unwanted light contamination in the transparent wedge 1008.

Meanwhile, during the capture phase, the window-simulation controller 110 can have received image information from the remote companion device. In a projection phase, the window-simulation controller 110 can turn on the backlight 908. The window-simulation controller can generate a corresponding image on the transparent OLED 1002 using the received image information. This image can be viewed by the user looking at the front side 106 of the device 104A from the position, location, and eye gaze direction as defined in the eye-related information. This process can be thought of as one cycle (e.g., one capture phase and one projection phase) and as mentioned above can be repeated at a rapid rate to be undetected by the user (such as 50 Hertz or higher).

Viewed from one perspective, the described configuration can function as a flat panel display (e.g., thin in the z reference direction) that can capture light rays from a full range of directions and distances of a viewer of the device 104A. The wedge device camera 1010 (e.g., an individual camera of multiple cameras) can be selected to capture light striking a specific column of the wedge device. The spatial light deflector 904 can steer light rays at specific points along the column and/or from specific directions into the wedge device 906 at an angle so that they will be trapped in the wedge device's transparent wedge 1008 and ultimately captured by the camera 1010.

FIG. 11 shows another device configuration 104B. This device configuration is similar in several aspects to device 104A of FIG. 10. Noteworthy differences include the addition of a projector 1102 that is positioned along the wide end of the transparent wedge 1008 in a similar manner to the camera 1010. The capture phase of device 104B is similar to the capture phase described above relative to FIG. 10. In the projection phase, the window-simulation controller 110 can cause the image information from the remote companion device to provide the basis for an image to be projected from projector 1102 into the transparent wedge 1008. The image can be projected out of the front surface of the transparent wedge and steered by the electro-wetting prism array 1004. The form of the image that is emitted from the front side of the electro-wetting prism array 1004 can be seen by the user's eyes. Thus, in this case the projector 1102, the transparent wedge 1008, and the electro-wetting prism array 1004 function as the display and thus a dedicated display component, such as the transparent OLED display 1002 of FIG. 10 is not utilized. Thus, a similar functionality can be achieved with fewer and/or potentially less expensive components.

From one perspective, the capture aspect of device 104B is similar to the capture aspect of device 104A of FIG. 10. However, the projection phase differs in that light rays of an image are emitted from the projector 1102 along the x reference axis and then steered after they leave the wedge device 906 by the spatial light deflector 904 to create the image for the user.

FIG. 12 shows another device configuration 104C that is similar to device 104A of FIG. 10. In this case, device 104C can include an array of mirrors 1202. Individual mirrors 1203 of the array of mirrors can be adjustable or steerable relative to a single reference axis such as the x reference axis. The array of mirrors can be assembled using various techniques. In one such case each mirror 1203 can be secured to a piezoelectric element (not shown) that is individually electrically coupled to the window-simulation controller 110. The array of mirrors 1202 can work cooperatively with the electro-wetting prism array 1004 to steer specific light rays into the transparent wedge 1008 in a manner that the light rays are propagated within the transparent wedge until captured by the camera 1010. The window-simulation controller 110 can selectively variably energize the piezoelectric element(s) to orient individual mirrors 1203 at an angle that reflects the light rays of interest onto the transparent wedge 1008 at the critical angle so that the light rays are reflected down the transparent wedge to the camera 1010. Other individual mirrors that are not at positions to be struck by light rays of interest can be oriented differently so that light rays which strike them are not captured by the transparent wedge. For instance, the window-simulation controller can selectively variably energize the piezoelectric element to orient the individual mirror 1203 in the array of mirrors 1202 at an angle that reflects the light rays of interest onto the transparent wedge 1008 at the critical angle so that the light rays are reflected down the transparent wedge to the camera 1010. Other individual mirrors 1203 in the array of mirrors 1202 that are not at positions to be struck by light rays of interest can be oriented differently so that light rays which strike them are not captured by the transparent wedge 1008.

FIG. 13 shows another device configuration 104D. In this case, individual mirrors 1203 of the array of mirrors 1202 can be selectively individually controllable by the window-simulation controller 110 in two axes of movement, such as relative to the x and y reference axes. As such, in this configuration the array of mirrors can function as the spatial light deflector 904 in place of the electro-wetting prism array 1004 employed in FIGS. 10-12. In essence, in the capture phase, the array of mirrors can be adjusted to steer specific light rays into the transparent wedge 1008 for capture by the camera 1010. Note that these light rays may have already passed through the transparent wedge 1008 from the front side 106 and then struck an individual mirror 1203 of the array of mirrors 1202. The mirror 1203 can reflect the light back at the transparent wedge 1008 at an angle that is more likely to be trapped by the transparent wedge. During the projection phase, light from the projector 1102 can exit the transparent wedge 1008 and be reflected (e.g. steered by the array of mirrors 1202) in a desired direction (e.g., toward the user's eyes).

Viewed from one perspective, the above configurations represent examples of ways that deflectors can alter the point of view of a wedge camera, (left/right, up/down, and/or forward/back) to capture light that would be seen by the user. In a similar manner, the deflectors can deflect outgoing light toward the user as desired.

Example Systems

FIG. 14 shows one example window-simulation system 1400. The system illustrates two device configurations manifest as device 104 (described above relative to FIGS. 1-13) and another device form factor 104E manifest as a table type device. Individual devices can include instances of elements described above relative to FIGS. 1-13 such as windows-simulation controller 110, as well as a processor(s) 1402, and/or storage/memory 1404. Further, an individual device, such as device 104, may include these components or operate cooperatively with another device, such as device 1406, which includes these components. Further, individual devices can utilize remote resources, such as cloud-based resources 1408. For example, an instance of windows-simulation controller 110 may be implemented on the cloud-based resources. This cloud-based version of the windows-simulation controller can perform some or all of the functionality described by the local instance of the windows-simulation controller in the description above relating to FIGS. 1-13. Note that an instance of device 104 can alternatively or additionally include other elements, such as, buses, graphics cards (e.g., graphics processing units (GPUs), network hardware), microphones and speakers (to provide the audio signal corresponding to the visual images described above relative to FIGS. 1-8), etc., which are not illustrated or discussed here for sake of brevity.

From one perspective, devices 104 can be thought of as computers. Processor 1402 can execute data in the form of computer-readable instructions to provide a functionality. Data, such as computer-readable instructions and/or user-related data, can be stored on storage 1404, such as storage that can be internal or external to the computer. The storage can include any one or more of volatile or non-volatile memory, hard drives, flash storage devices, and/or optical storage devices (e.g., CDs, DVDs etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some configurations, devices 104 can include a system on a chip (SOC) type design. In such a case, functionality provided by the computer can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPUs), graphical processing units (GPUs), controllers, microcontrollers, processor cores, or other types of processing devices suitable for implementation both in conventional computing architectures as well as SOC designs.

Examples of other computers can include traditional computing devices, such as personal computers, desktop computers, notebook computers, cell phones, smart phones, personal digital assistants, pad or tablet type computers, cameras, large display devices, projection devices, interactive digital displays, smart wearable devices, entertainment devices, and/or any of a myriad of ever-evolving or yet to be developed types of computing devices. In some cases, the display device can include computer elements, and thus be thought of as a computer. In other cases, the display device can communicate with and be controlled by a computer.

METHOD EXAMPLES

Figure 15:
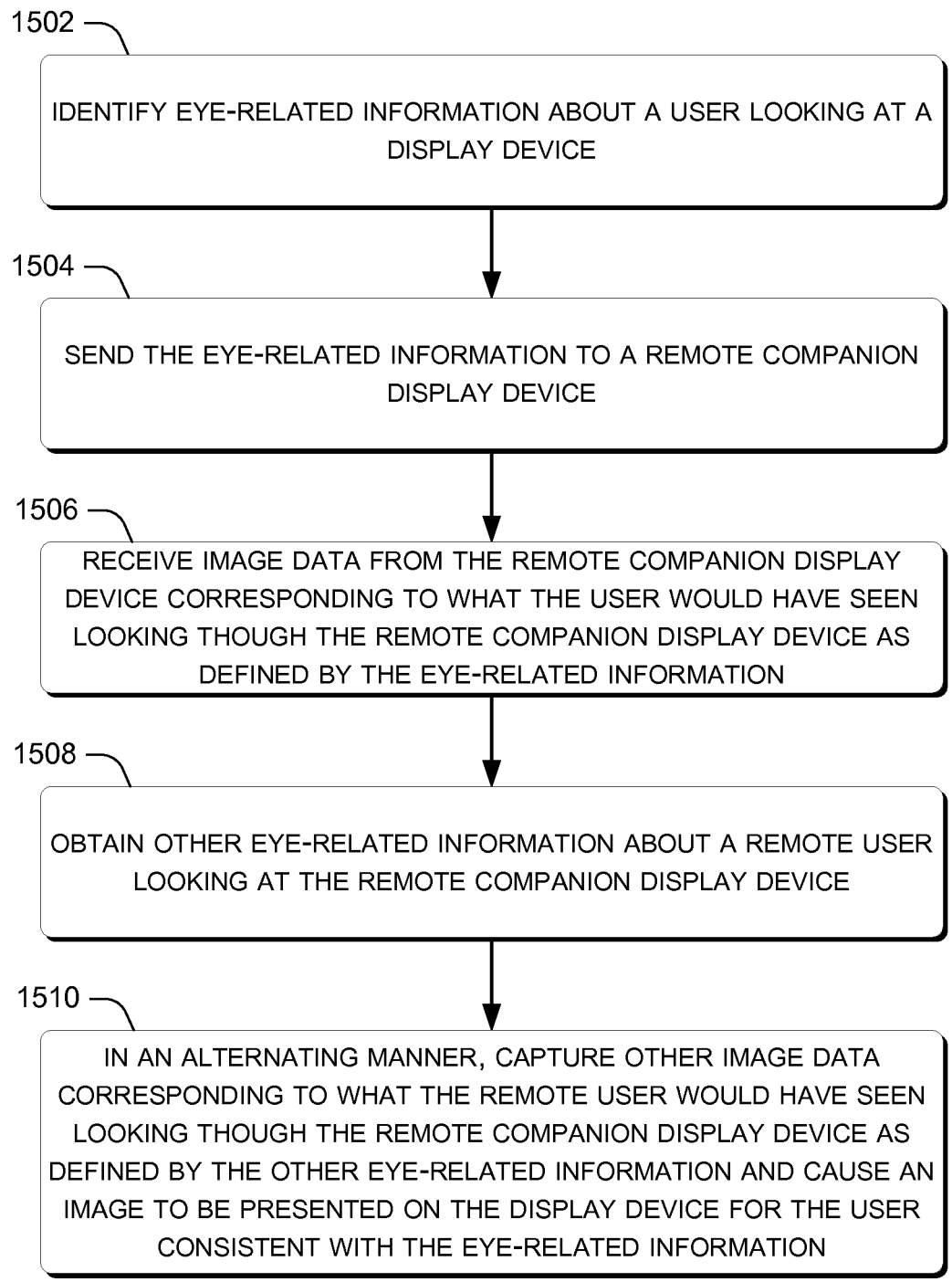
FIG. 15 shows an example window-simulation flowchart in accordance with some implementations of the present concepts.

FIG. 15 shows an example method 1500.

In this case, the method can identify eye-related information about a user looking at a display device at block 1502.

The method can send the eye-related information to a remote companion device at block 1504.

The method can receive image data from the remote companion display device corresponding to what the user would have seen looking though the remote companion display device as defined by the eye-related information at block 1506.

The method can obtain other eye-related information about a remote user looking at the remote companion display device at block 1508.

The method can in an alternating manner, capture other image data corresponding to what the remote user would have seen looking though the remote companion display device as defined by the other eye-related information and cause an image to be presented on the display device for the user consistent with the eye-related information at block 1510.

The described methods can be performed by the systems and/or devices described above relative to FIGS. 1-14, and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on computer-readable storage media as a set of instructions such that execution by a computing device causes the computing device to perform the method.

ADDITIONAL EXAMPLES

Various examples are described above. Additional examples are described below. On example is manifest as a system that can include a display having front and back surfaces and a spatial light deflector juxtaposed against the back surface of the display. The system can also include a wedge device juxtaposed against the spatial light deflector and a camera associated with the wedge device. The system can also include a window-simulation controller configured to receive information about a remote user in front of a remote display. The information can include a location of the remote user relative to the remote display and a direction that the remote user is looking. The window-simulation controller can be configured to simulate that the remote user is at the location behind the display and looking in the direction at the display. The window-simulation controller can be configured to identify a region of light that would pass through the display and be visible to the simulated remote user and cause the spatial light deflector to steer the region of light into the wedge device and to cause the camera to capture an image of the region of light from the wedge device. The window-simulation controller is further configured to cause the image to be sent to the remote display.

Any combination of the above and/or below examples where the first portion comprises a housing portion and the second portion comprises another housing portion.

Any combination of the above and/or below examples where the spatial light deflector comprises an array of independently controllable electro-wetting prisms.

Any combination of the above and/or below examples where the display is embodied as a transparent organic light emitting diode (OLED) display.

Any combination of the above and/or below examples embodied on a single device.

Any combination of the above and/or below examples where the location of the remote user includes a distinct location of each of the remote user's left and right eyes, and the window-simulation controller is configured to perform the simulating for the left eye and then the right eye to capture a pair of stereoscopic images.

Any combination of the above and/or below examples further including a depth camera positioned to sense a space in front of the display. The window-simulation controller is configured to process signals from the depth camera to identify a location of the user's eyes relative to the front of the display and a direction the user is looking. The window-simulation controller is further configured to send the location of the user's eyes and the direction the user is looking to the remote display.

Any combination of the above and/or below examples further including an array of independently controllable mirrors configured to further steer the region of light for capture by the wedge device.

Any combination of the above and/or below examples where the array of independently controllable mirrors are positioned on an opposite side of the wedge device as the spatial light deflector or where the array of independently controllable mirrors are positioned on a same side of the wedge device as the spatial light deflector.

Any combination of the above and/or below examples where the array of independently controllable mirrors are controllable along a single axis or wherein the array of independently controllable mirrors are controllable along two axes.

Any combination of the above and/or below examples further including a backlight positioned on an opposite side of the wedge device as the spatial light deflector and configured to project randomly oriented light toward the back of the display.

Any combination of the above and/or below examples where the camera comprises an array of cameras positioned along a wide end of the wedge device and wherein the window-simulation controller is configured to identify which individual cameras capture the image.

Any combination of the above and/or below examples where the wedge device comprises a transparent wedge positioned proximate to a prismatic sheet.

Any combination of the above and/or below examples further including a projector associated with the wedge device and configured to produce a remote image through the display.

Any combination of the above and/or below examples where the window-simulation controller is further configured to cause the image to be captured and the remote image to be produced in an alternating fashion at a rate that is not detectable to the user.

Any combination of the above and/or below examples where the system includes the display and the remote display.

Any combination of the above and/or below examples where the remote user comprises multiple remote users and wherein the window-simulation controller is configured to cause an individual image to be captured for each of the multiple users.

Another example can be manifest as a device that can include a display having front and back surfaces and that is configured to project light from the front surface. The device can also include a spatial light deflector juxtaposed against the back surface and that is configured to receive other light that passes through the display and to refract the other light. The device can also include a wedge device that can be configured to receive the refracted other light from the spatial light deflector. The device can also include a camera that can be configured to capture the refracted other light captured by the wedge device.

Any combination of the above and/or below examples where the spatial light deflector comprises an array of independently controllable electro-wetting prisms.

Any combination of the above and/or below examples where the light projected from the front surface of the display corresponds to images captured at a remote device.

Still another example is manifest as a device that can include a transparent display and an array of independently controllable electro-wetting prisms positioned behind the transparent display. The device can also include a wedge device positioned behind the array. The device can also include a window-simulation controller configured to identify light passing through the display from a specific direction that will converge at a specific point behind the wedge. The window-simulation controller is configured to adjust individual electro-wetting prisms to cause the light striking the individual electro-wetting prisms to be refracted at an angle so that the light is more likely to be captured by the wedge device and not pass through to the specific point.

Still another example is manifest as a device that can include a spatial light deflector comprising a steerable array of light deflecting elements and a wedge device positioned in a light receiving relation to the spatial light deflector. The device can also include a camera positioned at an end of the wedge device to receive light from the wedge device.

Any combination of the above and/or below examples where the spatial light deflector is in front of the wedge device relative to a source of the light or where the spatial light deflector is behind the wedge device relative to a source of the light.

Any combination of the above and/or below examples where the spatial light deflector comprises a prism array or a mirror array.

Any combination of the above and/or below examples where the camera comprises multiple linearly arranged cameras.

Any combination of the above and/or below examples further including at least one projector configured to project different light into the wedge device.

Any combination of the above and/or below examples further including a window-simulation controller configured to identity light from a specific direction that will converge at a specific point behind the wedge device. The window-simulation controller is configured to adjust individual regions of the spatial light deflector to cause the light striking the individual regions to be refracted or reflected at an angle so that the light is more likely to be captured by the wedge device and not pass through to the specific point.

Any combination of the above and/or below examples where the camera comprises multiple linearly arranged cameras.

Any combination of the above and/or below examples where the window-simulation controller is further configured to control the camera and the projector in an alternating manner.

Still another example is manifest as a method or process that can identify eye-related information about a user looking at a display device and can send the eye-related information to a remote companion display device. The method can receive image data from the remote companion display device corresponding to what the user would have seen looking though the remote companion display device as defined by the eye-related information. The method can obtain other eye-related information about a remote user looking at the remote companion display device. In an alternating manner, the method can capture other image data corresponding to what the remote user would have seen looking though the display device as defined by the other eye-related information and cause an image to be presented on the display device for the user consistent with the eye-related information.

A further example is manifest as means for identifying eye-related information about a user looking at a display device and sending the eye-related information to a remote companion display device. The example can include means for receiving image data from the remote companion display device corresponding to what the user would have seen looking though the remote companion display device as defined by the eye-related information. The example can include means for obtaining other eye-related information about a remote user looking at the remote companion display device. The example include means for capturing other image data corresponding to what the remote user would have seen looking though the display device as defined by the other eye-related information and means for causing an image to be presented on the display device for the user consistent with the eye-related information.

CONCLUSION

Although techniques, methods, devices, systems, etc., pertaining to window-simulations are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:
 a display having front and back surfaces;
 a spatial light deflector juxtaposed against the back surface of the display;
 a wedge device juxtaposed against the spatial light deflector, the wedge device comprising a transparent wedge;
 a camera associated with the wedge device;
 a processor; and
 storage having computer-readable instructions which, when executed by the processor, cause the processor to:
 receive information about a remote user in front of a remote display, the information comprising a location of the remote user relative to the remote display and a direction that the remote user is looking;
 simulate that the remote user is at the location behind the display and looking in the direction at the display;
 identify a region of light that would pass through the display and be visible to the simulated remote user;
 cause the spatial light deflector to steer the region of light into the wedge device;
 cause the camera to capture an image of the region of light from the wedge device; and
 cause the image to be sent to the remote display.

2. The system of claim 1, wherein the spatial light deflector comprises an array of independently controllable electro-wetting prisms.

3. The system of claim 1, wherein the display is embodied as a transparent organic light emitting diode (OLED) display.

4. The system of claim 1, embodied on a single device.

5. The system of claim 1, wherein the location of the remote user includes a distinct location of each of the remote user's left and right eyes, and wherein the computer-readable instructions, when executed by the processor, cause the processor to perform the simulating for the left eye and the right eye to capture a pair of stereoscopic images.

6. The system of claim 1, further comprising:
 a depth camera positioned to sense a space in front of the display, wherein a local user is present in the space;
 wherein the computer-readable instructions, when executed by the processor, cause the processor to:
 process signals from the depth camera to identify a location of the local user's eyes relative to the front of the display and a direction the local user is looking; and
 send the location of the local user's eyes and the direction the local user is looking to the remote display.

7. The system of claim 1, further comprising an array of independently controllable mirrors configured to further steer the region of light for capture by the wedge device.

8. The system of claim 7, wherein the array of independently controllable mirrors is positioned on an opposite side of the wedge device as the spatial light deflector or wherein the array of independently controllable mirrors is positioned on a same side of the wedge device as the spatial light deflector.

9. The system of claim 7, wherein individual mirrors of the array of independently controllable mirrors are controllable along a single axis or wherein the individual mirrors of the array of independently controllable mirrors are controllable along two axes.

10. The system of claim 1, further comprising a backlight positioned on an opposite side of the wedge device as the spatial light deflector and configured to project randomly oriented light toward the back of the display.

11. The system of claim 1, wherein the camera comprises an array of cameras positioned along a wide end of the wedge device and wherein the computer-readable instructions, when executed by the processor, cause the processor identify which individual cameras capture the image.

12. The system of claim 1, wherein the transparent wedge is positioned proximate to a prismatic sheet.

13. The system of claim 1, further comprising a projector associated with the wedge device and configured to produce a remote image through the display.

14. The system of claim 13, wherein the computer-readable instructions, when executed by the processor, cause the processor to cause the image to be captured and the remote image to be produced in an alternating fashion at a rate that is not user-detectable.

15. The system of claim 13, wherein the system includes the display and the remote display.

16. The system of claim 1, wherein the remote user comprises multiple remote users and wherein the computer-readable instructions, when executed by the processor, cause the processor to cause an individual image to be captured for each of the multiple remote users.

17. A device, comprising:
 a display having front and back surfaces and configured to project light from the front surface;
 a spatial light deflector juxtaposed against the back surface and configured to receive other light that passes through the display and to refract the other light;
 a wedge device configured to receive the refracted other light from the spatial light deflector; and,
 a camera configured to capture the refracted other light captured by the wedge device,
 wherein the wedge device comprises a transparent wedge configured to reflect the refracted other light within the transparent wedge until the refracted other light reaches the camera.

18. The device of claim 17, wherein the spatial light deflector comprises an array of independently controllable electro-wetting prisms.

19. The device of claim 17, wherein the light projected from the front surface of the display corresponds to images captured at a remote device.

20. A device, comprising:
 a steerable array of light deflecting elements;
 a transparent wedge; and
 a camera,
 the transparent wedge positioned in a light receiving relation to the steerable array, the transparent wedge having a wide end tapering to a narrow end and configured to direct incoming light from the steerable array to the camera, the camera positioned at the wide end of the transparent wedge, the camera being configured to receive the incoming light from the transparent wedge.

\* \* \* \* \*